United States Patent
Pearce

[15] 3,672,208
[45] June 27, 1972

[54] TESTING DEVICE FOR TESTING EDGES OF CYLINDERS FOR DEFECTS

[72] Inventor: Ronald A. Pearce, Lakewood, Colo.
[73] Assignee: Coors Container Company, Golden, Colo.
[22] Filed: Sept. 25, 1970
[21] Appl. No.: 75,555

[52] U.S. Cl. ..........................................73/49.2
[51] Int. Cl. .........................................G01m 3/32
[58] Field of Search.................73/49.2, 45, 45.1, 493, 40

[56] References Cited

UNITED STATES PATENTS 2,880,610   4/1959   McCoy..................................73/49.2
1,606,486   11/1926   Stevens.................................73/49.2

Primary Examiner—Louis R. Prince
Assistant Examiner—William A. Henry, II
Attorney—Bertha L. MacGregor

[57] ABSTRACT

A testing device for testing edges of cylinders for defects comprising a flexible diaphragm member and a holder for said member through which compressed air is injected into a cylinder to be tested while the diaphragm is in cylinder sealing position relatively to the end of the cylinder. The cylinder is positioned in a pressure casing which provides an air chamber between the casing and the cylinder. Measurement of the air pressure in the chamber indicates whether any compressed air has leaked out of the cylinder due to defect in the cylinder. The diaphragm-sealing member comprises a flexible bearing wall sealing the end of the cylinder to be tested, said bearing wall becoming deformed under light pressure without being compressed and avoiding defect-concealing engagement with the cylinder side walls when in sealing contact with the cylinder and edge.

6 Claims, 3 Drawing Figures

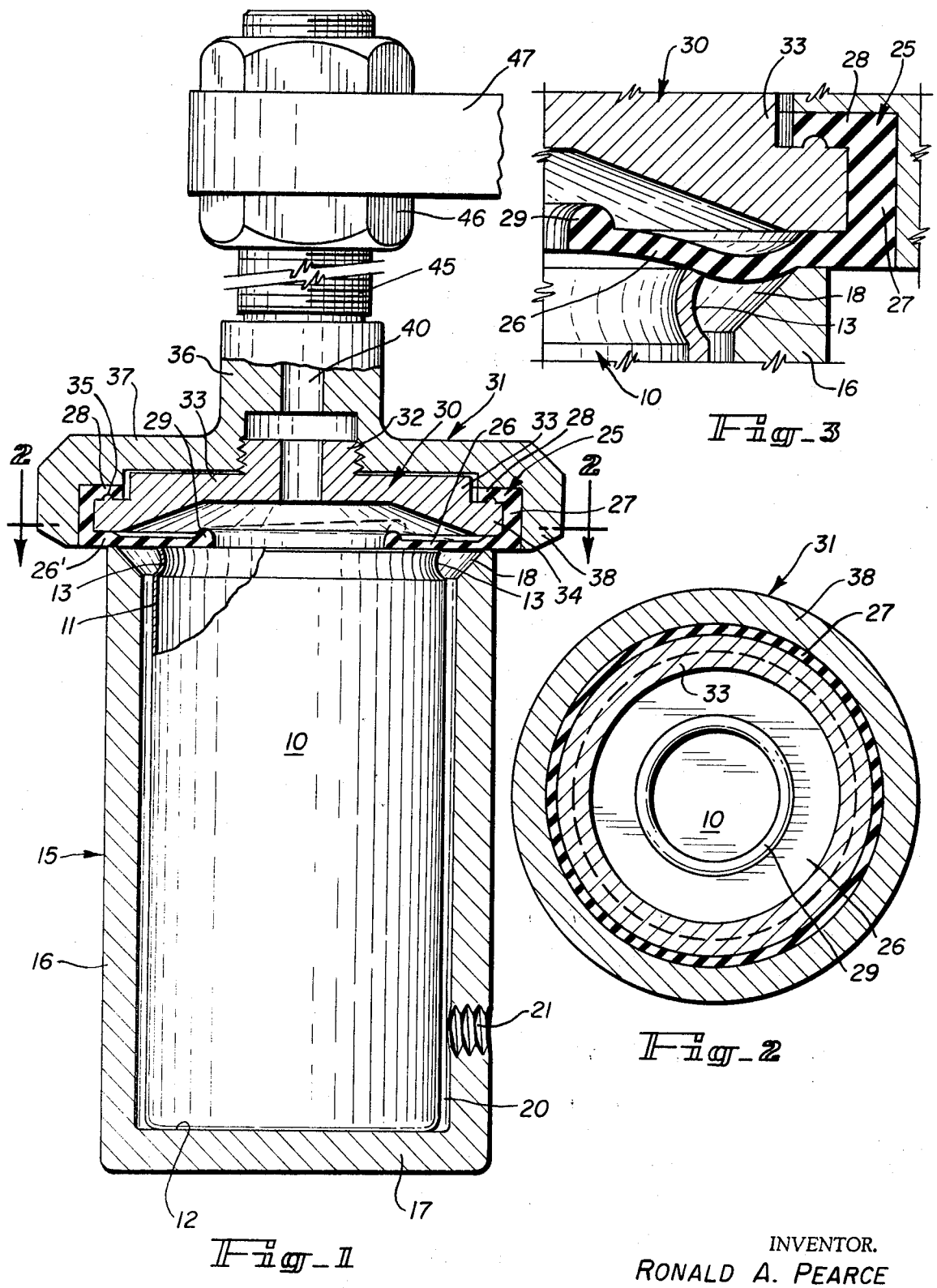

TESTING DEVICE FOR TESTING EDGES OF CYLINDERS FOR DEFECTS

This invention relates to a device for use in testing edges of cylinders for defects. More particularly, the device is designed for testing the circumferential edges of cylinders such as containers, tubes, conduits, hydraulic lines and the like for the purpose of disclosing defects in said edges. The defects may be splits, dents, nicks, notches, and the like. When the defects exist in containers they permit the container contents to leak out and allow air to pass into the container, resulting in spoilage and contamination. In cylindrical bodies such as food and beverage cans provided with one closed end, the defects are likely to be located in or near the circumferential edge of the open end of the can which has been trimmed to receive a cover.

Heretofore cylindrical bodies have been tested for defects by employing compressed air injected into each cylinder through an opening in a relatively hard rubber disc pressed against the open end of the cylinder. Such discs are an inch or more in thickness and the rubber compound of which they are made is relatively hard and inflexible. When installed in prior art testing machines, discs of the character described are forced under substantial pressure against the open ends of cylinders in order to provide an air tight chamber in each cylinder for reception of air under pressure to be measured externally of the cylinder to detect defects which permit escape of the air from the cylinder. The construction of such prior art discs coupled with the pressure required to place them in sealing relationship to the cylinder to be tested has heretofore resulted in contact not only between the sealing disc and the actual edge of the cylinder but has also resulted in contact between the disc and the side surfaces, both internal and external, adjacent the circumferential edge of the cylinder.

Such contact between the prior art sealing discs and the side wall surfaces adjacent the circumferential edge of the cylinder has been found to conceal defects existing in or near the edge and extending from the edge of the cylinder into the side wall adjacent the edge. This condition results in use of cylinders faulty for their intended purposes, necessitating later more costly rejection.

The main object of this invention is to provide cylinder testing means which obviate the existing objections and disadvantages, comprising sealing means which contact only the true circumferential edge of the cylinder to be tested, i.e., the edge surface which is disposed at right angles to the axis of the cylinder, and deform in use only in such manner as to avoid defect-concealing contact with the side wall surfaces adjacent the circumferential edge of the cylinder.

Another object of the invention is to provide cylinder sealing and defect detecting means which radically reduce the initial cost of the device as well as cost of installation in testing machines.

The novel sealing and defect-detecting means of this invention preferably comprises a diaphragm having a relatively thin flexible bearing wall for contact with the cylinder edge to be tested, and peripheral portions shaped for mounting in a holder. The diaphragm is subjected to relatively light pressure against the cylinder edge to produce edge contact only and to avoid defect-concealing contact with side wall surfaces adjacent the actual edge.

In the drawing:

FIG. 1 is a longitudinal sectional view of a cylinder edge testing device, partly in elevation, showing a cylindrical body such as a can having one closed end, located in a pressure casing, with the sealing member mounted in a holder adjacent the open ends of the can and pressure casing.

FIG. 2 is a transverse sectional view in the plane of the line 2—2 of FIG. 1.

FIG. 3 is a sectional view of part of the sealing member, cylindrical body and pressure casing, on an enlarged scale, showing the sealing member as it appears when deformed under light pressure.

In the embodiment of the invention shown in the drawing, a cylindrical body such as the container 10 comprises side walls 11, a closed end 12, and a flanged open end 13. The container 10 is located in a pressure casing 15 comprising side walls 16, a closed end 17 and an open end defined by the beveled edge 18. The diameters of the container 10 and casing 15 are such that an air chamber 20 is provided between the respective side walls 11 and 16. The end surfaces of the beveled edge 18 and flanged end 13 are approximately flush. Access is provided to the air chamber 20 by pressure measuring means (not shown) through the opening 21 in the side 16.

A diaphragm 25 of flexible material is circular in shape, and comprises a flexible bearing wall 26 integral with a peripheral wall 27 extending at right angles to the bearing wall 26, the wall 27 being integral with an inturned flange 28. The flexible bearing wall 26 is provided with a central aperture surrounded by a convex molding or bead 29. The bearing wall 26 has a thickened portion 26' adjacent its peripheral junction with the wall 27. The parts 25–29 constitute the test seal which contacts the edge of the cylindrical body to be tested, and confines pressurized air in the cylinder. The flexible diaphragm bearing wall 26 is deformed under light pressure in the cylinder 10, without compression of the wall 26, as shown in FIG. 3, and more fully described hereinafter.

The seal 25 is mounted in a seal holder comprising two parts, namely, an inner holder member 30 and an outer holder member 31. The member 30 consists of an externally threaded neck 32, flat surfaced shoulder 33 and annular peripheral projection 34, the latter being of a depth to fit between the inturned flange 28 of the seal or diaphragm 25 and the portion 26' of the bearing wall 26. The projection 34 is provided with a small convex annular rib 35 which engages the inturned flange 28 of the seal 25. The outer holder member 31 cooperates with the inner member 30 to hold the seal 25 firmly in predetermined position. The member 31 comprises a neck 36 internally threaded to engage the threads of the neck 32, and a flat surfaced shoulder 37 parallel to the shoulder 33 of the inner holder, terminating peripherally with downturned portions 38 internally surfaced to contact the outer surfaces of the seal portions 28 and 27. When assembled, the two holder members firmly grip the diaphragm-sealing member. The two holder members 30 and 31 are centrally apertured to form a passageway 40 for passage of pressurized air into the cylindrical body 10.

To assemble the holder and seal, the diaphragm 25 is fitted on the inner holder 30 so that the peripheral projection 34 is located snugly in the recess formed by the diaphragm walls 26', 27 and 28. Then the outer holder member 31 is placed on the inner member and on the exposed parts of the diaphragm seal, and turned so that the threads of the neck 36 engage the threads of the neck 32 and draw the two holder members toward each other.

The holder assembly is adjustably coupled to a source of compressed air through a threaded tube or conduit 45 and nut 46, which permits the holder assembly to be adjustably located by means 47 as required to accommodate cylindrical bodies 10 and pressure casings 15 of different lengths.

The test assembly comprising the holder members 30, 31, and the flexible diaphragm-seal 25, together with the pressure casing 15 and the cylindrical body 10 to be tested, are mounted in a frame (not shown) for locating the casing and moving it and the cylindrical body 10 into proper position relatively to the diaphragm 25. Any suitable mechanism (not shown) may be employed for this purpose. The cylindrical body 10 is located relatively to the diaphragm 25 so that the edge surface is in sealing contact with the bearing wall 26. At the beginning of the test, a valve (not shown) communicating with the air chamber 20 is open to the atmosphere. Next, shown) through inside the cylinder 10 is increased to approximately 10 lbs. and the said valve to the chamber 20 is closed. Then the air pressure in the chamber 20 is measured to determine whether any increase in the atmospheric pressure therein has occurred due to passage of pressurized air from the cylinder 10 to the chamber 20, indicating existence of a defect in the cylinder 10 allowing such passage. The pressure of approximately 10 lbs. employed for injection into the cylinder 10 causes deformation without compression of the diaphragm wall 26, such that the wall remains in sealing contact with the actual edge surface 13 but does not conceal any defects which may exist adjacent the edge surface 13. The deformed position of the bearing wall 26 of the diaphragm 25 is shown in FIG. 3. The cylinder sealing means thus avoids concealing defects near the cylinder edge and eliminates the use of heavy pressure to seat the cylinder contacting means, and serious objections and disadvantages of the prior art sealing means.

The testing pressure exerted on the sealing device flexible wall 26 by the compressed air injected into the cylinder 10 assists in maintaining sealing contact between the sealing device 25 and the cylinder edge, whereas in prior art apparatus for testing cylinders, the air pressure tends to unseat the sealing means. Such prior art devices have been made of compressible rubber and have required greater mechanical force to maintain the sealing contact, resulting in covering of defects adjacent cylinder edges and consequent failure to detect such defects. The diaphragm-sealing device of my invention is characterized by its flexible bearing wall which deforms under light pressure without compression of the bearing wall while in sealing engagement with the end of the cylinder to be tested.

In a conventional cylinder testing machine, 48 containers or other cylinders are tested, requiring an equal number of pressure casings 15, sealing means 25 and holders therefor. Heretofore the mounting of each such testing devices in the machine has required an average of 15 minutes, whereas the mounting time for the testing devices of this invention is about one minute. Further, the initial cost of the diaphragm herein shown and described is approximately one sixth of the cost of the prior art seal which it replaces.

I claim:

1. A device for testing edges of cylinders for defects comprising
   a. a cylinder sealing diaphragm having a flexible relatively thin flat surfaced bearing wall contacting a cylinder edge and a peripheral side wall portion and inturned flange, the bearing wall being integral with said peripheral side wall portion and deformed under light pressure without being compressed when in contact with the cylinder end edge and avoiding defect-concealing engagement while in sealing contact with the cylinder end edge,
   b. the diaphragm bearing wall is provided with a bead which surrounds the opening in the diaphragm;
   c. a holder positioning the sealing diaphragm on the cylinder edge,
   d. openings in the holder and diaphragm providing a passageway for injection of compressed air into the cylinder when the diaphragm is in sealing contact with the cylinder edge, and
   e. means for measuring air externally of the cylinder to indicate whether any defect exists in the cylinder permitting passage of air out of the cylinder.

2. The testing device defined by claim 1, in which the peripheral side wall portion and inturned flange of the sealing diaphragm are gripped by the holder.

3. The testing device defined by claim 1, in which the holder comprises an inner and an outer member, and the peripheral side wall portion and inturned flange of the sealing diaphragm are gripped between said holder members.

4. The testing device defined by claim 3, in which the inner holder member consists of a threaded neck, a flat surfaced shoulder portion extending radially from the neck, and a peripheral portion projecting into the diaphragm, and the outer holder member consists of a threaded neck engaging the neck of the inner member, a shoulder portion parallel to the shoulder portion of the inner member, and a downturned peripheral portion confining the peripheral side wall portion and inturned flange portion of the diaphragm.

5. A device for testing edges of cylinders for defects comprising means for injecting air under pressure into the cylinder to be tested, and a flexible sealing diaphragm which has a peripheral portion and a relatively thin bearing wall contacting the cylinder edge, said thin bearing wall deforming under light pressure without compression, and avoiding defect-concealing contact with the cylinder while in sealing contact with the cylinder edge, said device including a two part holder which grips the peripheral portion of the sealing diaphragm and positions the diaphragm on the cylinder edge.

6. The testing device defined by claim 5, which includes a pressure casing containing the cylinder to be tested and providing an air chamber between the cylinder and the casing, openings in the holder and diaphragm providing a passageway for compressed air into the cylinder, and means for measuring air in the air chamber to indicate whether any defect exists in the cylinder permitting passage of air from the cylinder to the air chamber.

* * * * *